United States Patent [19]
Park et al.

[11] Patent Number: 6,005,718
[45] Date of Patent: Dec. 21, 1999

[54] APPARATUS AND A METHOD FOR COMBINING LIGHT USING ONE FLAT PLATE AND A METHOD FOR MANUFACTURING THE APPARATUS

[75] Inventors: Jung Ho Park, Sungnam; Young Jun Park, Euwang; Young Mo Hwang, Seoul, all of Rep. of Korea

[73] Assignee: Samsung Electronics Co., Ltd., Suwon, Rep. of Korea

[21] Appl. No.: 09/075,842

[22] Filed: May 12, 1998

[30] Foreign Application Priority Data

Jul. 14, 1997 [KR] Rep. of Korea ........................ 97-32625
Mar. 5, 1998 [KR] Rep. of Korea ........................ 98-7208

[51] Int. Cl.$^6$ .............................. G02B 27/10; G02B 27/14
[52] U.S. Cl. ............................ 359/627; 359/628; 359/634
[58] Field of Search .................................... 359/634, 627, 359/628; 358/296

[56] References Cited

U.S. PATENT DOCUMENTS

| | | | |
|---|---|---|---|
| 4,125,864 | 11/1978 | Aughton ................................... | 358/298 |
| 4,533,215 | 8/1985 | Trias et al. ........................... | 350/347 E |
| 4,720,747 | 1/1988 | Crowley .................................... | 358/231 |
| 5,071,225 | 12/1991 | Inoue ....................................... | 359/634 |
| 5,253,073 | 10/1993 | Crowley .................................... | 358/231 |
| 5,311,321 | 5/1994 | Crowley .................................... | 348/760 |

FOREIGN PATENT DOCUMENTS 0 211 596 2/1987 European Pat. Off. .
55-25045 2/1980 Japan .

Primary Examiner—Scott J. Sugarman
Assistant Examiner—Michael A Lucas
Attorney, Agent, or Firm—Burns, Doane, Swecker & Mathis, L.L.P.

[57] ABSTRACT

A light combining apparatus using a flat plate operating to combine at least two incident light beams entering the flat plate at a first angle with respect to the vertical direction on an incidence plane with wavelengths different from each other. The apparatus comprises a first anti-reflection coating film for allowing only a light beam with a first wavelength to penetrate into the flat plate without reflection, a first wide band high-reflection mirror for reflecting the light beam with the first wavelength which penetrates through the first anti-reflection coating film at a second angle which is different from the first angle, a first dichroic mirror for generating a first combined light beam by allowing only a light beam with a second wavelength different from the first wavelength and reflecting the light beams with other wavelengths and by reflecting the reflected light beam with the first wavelength at the second angle, and for combining the light beam with the second wavelength and the reflected light beam with the first wavelength, a second wide band anti-reflection coating film for allowing the combined light beam to penetrate without reflection; and a material within the flat plate through which the light beam penetrated through the first anti-reflection coating film and the first dichroic mirror and the light beam reflected from the first wide band high-reflection coating film and the first dichroic mirror pass.

10 Claims, 2 Drawing Sheets

APPARATUS AND A METHOD FOR COMBINING LIGHT USING ONE FLAT PLATE AND A METHOD FOR MANUFACTURING THE APPARATUS

FIELD OF THE INVENTION

The present invention relates to a light combining apparatus combining three colors of red, blue and green that have been separated by light separation into one beam of light, a method for manufacturing the apparatus and a method for combining the light. The present invention has a structure for combining light sources of red, blue and green into one light beam by using a mirror mechanism devised in particular way. This system is a device which can be used for a light combining apparatus used in an image projection method of modulating light independently by a 3-channel acousto-optic modulator operating according to an image signal from each color and projecting modulated-monochromatic images of red, green and blue on a screen. This can be used for combining light such as in a color scanner and a color copier in addition to the above example.

DESCRIPTION OF THE RELATED ART

The prior typical means of light combining have performed color combining by using a set of individual devices such as prisms or dichroic mirrors as illustrated in FIG. 3. There have been difficulties in increasing optical efficiency and aligning light using these devices. Also when using devices for color combining in the prior laser projection display apparatus, there have been problems in that the system is too complicated and the size of the system is too large. When the system becomes too big, commercialization is difficult. Therefore, it is the trend of the time that the prior large-sized systems have been simplified and made into small-sized systems.

SUMMARY

The present invention is designed to solve the above problem by using one flat plate for combining three colors of red, green and blue. A first object of the present invention is to provide a light combining apparatus, which is far more compact and cost-effective as compared to the prior light combining system. A second object of the present invention is to provide a method for combining the light. A third object of the present invention is to provide a method for manufacturing the light combining apparatus.

In carrying out the present invention in one preferred mode, a light combining apparatus according to the present invention operates on two or more incident light beams entering with first and second wavelengths, respectively, the wavelengths being different from each other and at a first angle with respect to an incidence plane in a vertical direction. The apparatus comprises an anti-reflection coating film for allowing only the incident light beam having the first wavelength to penetrate without reflection, a first wide band high-reflection mirror for reflecting the light beam with the first wavelength which penetrates from the anti-reflection coating film in the vertical direction to a reflection plane at a second angle which is different from the first angle, a first dichroic mirror for generating a combined light beam by allowing only the light beam with the second wavelength to penetrate and reflecting the light beams with other wavelengths and by reflecting the reflected light beam with the first wavelength at the second angle, and combining the penetrated light beam with the second wavelength and the reflected light beam with the first wavelength, a first wide band anti-reflection coating film for allowing the combined light beam to penetrate without reflection; and a material through which the light beam penetrating the anti-reflection coating film and the dichroic mirror and the light beam reflected by the wide band high-reflection coating film and the dichroic mirror pass.

In the present invention, it is preferable that the thickness of the material is fixed such that the point that the light beam with the first wavelength reflected by the first wide band high-reflection mirror and by the first dichroic mirror is the same as the point that the light beam with the second wavelength penetrates into the material from the first dichroic mirror.

In the present invention, it is preferable that the first anti-reflection coating film and the first dichroic mirror are arranged with the first wide band high-reflection mirror and the first wide band anti-reflection coating film so that they are in parallel with each other.

In the present invention, it is preferable that the light combining apparatus, operating on incident light beams having wavelengths of red, green and blue entering parallel to one another at a first angle with respect to the vertical direction of an incidence plane, includes:

(a) A first anti-reflection coating film allowing the light beam with a first wavelength to penetrate without reflection at the first angle into a material;

(b) a first wide band high-reflection mirror reflecting the light beam with the first wavelength at a second angle which is different from the first angle;

(c) a first dichroic mirror generating a first combined light beam by allowing only a light beam with a second wavelength different from the first wavelength to penetrate into the apparatus at the first angle and reflecting the light beams having other wavelengths and by reflecting the reflected light beam with the first wavelength at the second angle at the point which the light beam with the second wavelength penetrates;

(d) a first wide band high-reflection mirror reflecting the first combined light beam at the second angle;

(e) a second dichroic mirror generating a second combined light beam by allowing only a light beam with a third wavelength different from the first wavelength and the second wavelength to penetrate into the apparatus at the first angle and reflecting the light beams with other wavelengths and by reflecting the reflected first combined light beam at the second angle at the point which the light beam with the third wavelength penetrates;

(f) a first wide band anti-reflection coating film penetrating the second combined light beam without reflection outside the apparatus; and (g) a material through which the light beams with the first wavelength, the first reflection light beam, the first combined light beam and the second combined light beam pass.

In carrying out the present invention according to one preferred mode, a method of combining light beams includes the steps of allowing only the light beam with a first wavelength to penetrate into the material at a first angle without reflection, reflecting the light beam with the first wavelength penetrated through the material at a second angle which is different from the first angle, generating a first combined light beam by penetrating only a light beam with a second wavelength different from the first wavelength to penetrate through the material at the first angle and reflecting the light beams with other wavelengths from and by reflecting the reflected light beam with the first wavelength at the second angle at a point at which the light beam having the second wavelength penetrates, reflecting the first combined light beam at the second angle through the material; generating a second combined light beam by allowing only a light beam with a third wavelength different from the first wavelength and the second wavelength to penetrate through the material at the first angle and reflecting the light beams with other wavelengths and by reflecting the reflected first combined light beam at the second angle at the point at which the light beam with the third wavelength penetrates, and allowing the second combined light beam to penetrate without reflection outside the material.

According to the present invention, it is preferable that at least one of the first angle and the thickness of the material is adjusted so that the first-reflected light beam with the first wavelength can be combined at the point at which the light beam with the second wavelength penetrates and the third-reflected first combined light beam can be combined at the point at which the light beam with the third wavelength penetrates.

In carrying out the present invention according to one preferred mode, a method for manufacturing a light combining apparatus includes the steps of applying an anti-reflection coating film to a section of one side on a flat plate having thickness t, a refractive index $n_G$ and both sides having sufficient flatness to pass a light beam with a first wavelength entered at a first angle from a light source without reflection into the flat plate, applying a first wide band high-reflection mirror in a section of the flat plate on an opposite side with respect to the side where the anti-reflection coating film is applied to reflect the light beam with the first wavelength penetrated through the anti-reflection coating film at a second angle which is different from the first angle, applying a first dichroic mirror on the same surface of the flat plane on which the anti-reflection coating film is applied and adjacent to the anti-reflection coating film to generate a first combined light beam by allowing only the light beam with the second wavelength different from the first wavelength to penetrate through a material and reflecting the light beams with other wavelengths and by reflecting the light beam reflected by the first wide band high-reflection mirror at the second angle at the point at which the light beam with the second wavelength penetrates, applying a second wide band high-reflection mirror on the same surface of the flat plate on which the first wide band high-reflection coating film is applied and adjacent to the first wide band high-reflection mirror to reflect the first combined light beam reflected from the first dichroic mirror at the second angle, applying a second dichroic mirror on the same surface of the flat plate on which the anti-reflection coating film and the first dichroic mirror are applied and adjacent to the first dichroic mirror to generate a second combined light beam by allowing only the light beam with a third wavelength different from the first wavelength and the second wavelength to penetrate and reflecting the light beams with other wavelengths and by reflecting the reflected light beam from the second wide band high-reflection at the second angle at the point at which the light beam with the third wavelength penetrates, and applying a wide band anti-reflection coating film on the same surface of the flat plane on which the first and second wide band high-reflection mirrors are applied and adjacent to the second wide band high-reflection mirror to allow the second combined light beam to penetrate without reflection outside the material.

According to the present invention, it is preferable that the process of making the first and second wide band high-reflection mirrors are performed as one step.

BRIEF DESCRIPTION OF THE DRAWINGS

Other objects and advantages of the invention will become apparent upon reading the following detailed descriptions and upon reference to the drawings.

Figure 1:
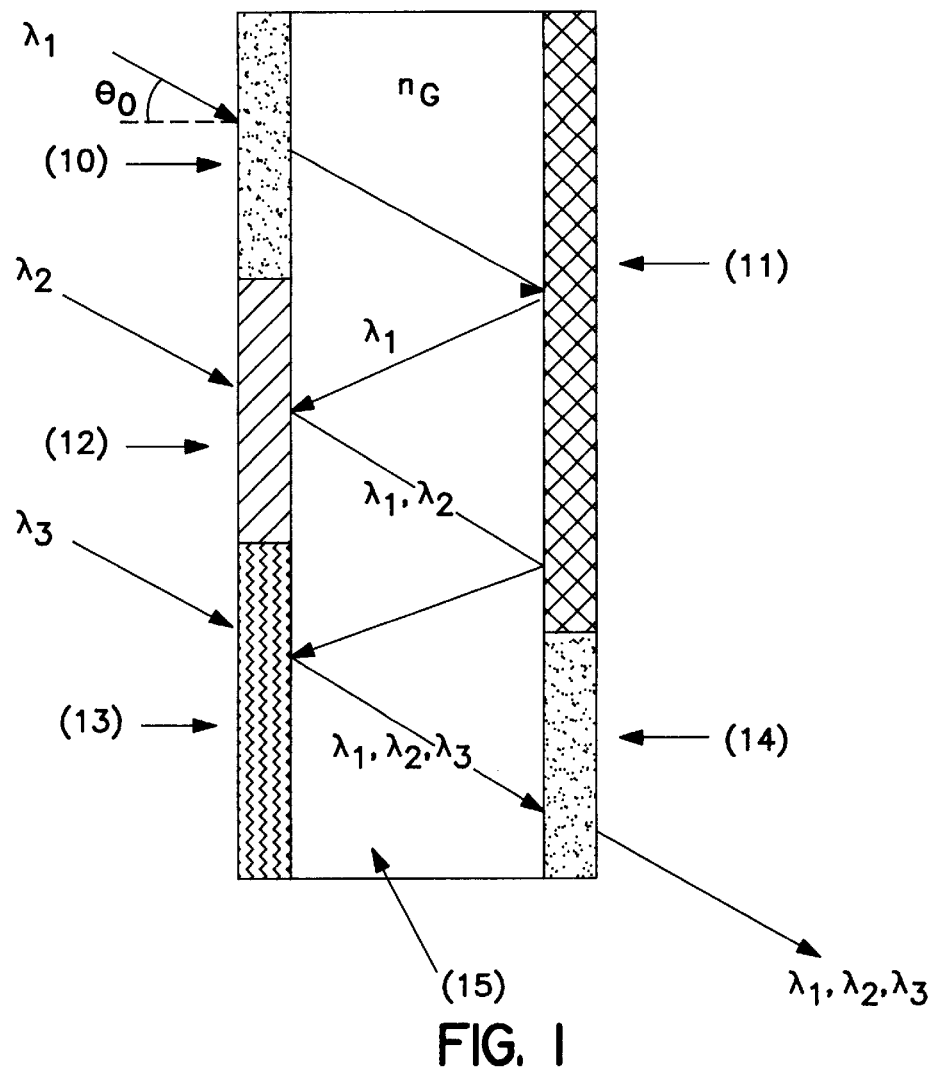
FIG. 1 illustrates a general structure of a light combining hybrid dichroic mirror using a flat plate according to the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The light combining apparatus according to the present invention combines three colors of red, blue and green that are separated by light separation into one light beam. A method for manufacturing the apparatus and method for light combining is also disclosed. The present invention has a structure for combining light sources of red, blue and green into one light beam by a mirror mechanism which is devised in a particular way. It can be used for a light combining apparatus used in an image projection method of modulating light independently by 3-channel acousto-optic modulator operating according to an image signal for each color and projecting modulated-monochromatic images of red, green and blue on a screen. The apparatus according to the present invention can be used for light combining such as required in a color scanner and a color copier (copying machine) in addition to the above example. A light combining apparatus of the present invention operates to combine two or more incident light beams entering with wavelengths different from each other and at the same angle with respect to the vertical direction with respect to an incidence plane at a first angle. The apparatus comprises a first anti-reflection coating film for allowing only an incident light beam with a first wavelength to penetrate without reflection, a first wide band high-reflection mirror for reflecting the light beam with the first wavelength at a second angle which is different from the first angle, a first dichroic mirror for generating a first combined light beam by allowing only a light beam with a second wavelength different from the first wavelength and reflecting the light beams with other wavelengths and by reflecting the reflected light beam with the first wavelength at the second angle, and combining the light beam with the second wavelength and the reflected light with the first wavelength reflected into a first combined light beam, a second dichroic mirror for generating a second combined light beam by allowing only a light beam with a third wavelength different from the other wavelengths and reflecting the light beam with the other wavelengths and for generating a second combined light beams with the first, the second and the third wavelengths, a second wide band anti-reflection coating film for allowing the second combined light beam to penetrate to the outside without reflection, and a material through which the light beam which penetrates through the anti-reflection coating film and the dichroic mirrors and the light beams reflected from the wide band high-reflection coating film and the second dichroic mirror pass.

The invention will be explained in detail through the drawings. A light combining apparatus according to the present invention includes an anti-reflection coating film 10 which allows the incident light beam with a first wavelength $\lambda_1$ to penetrate into the flat plate 15, without reflection. This incident light beam is one of two or more incident light beams entering with wavelengths $\lambda_1$, $\lambda_2$, $\lambda_3$ which are different from each other. The incident light beams all enter at a first angle $\theta_0$ with respect to the vertical direction in the incidence plane.

A wide band high-reflection mirror 11 reflects, for the first time, the light beam with the first wavelength $\lambda_1$ which penetrates through the anti-reflection coating film 10, at a second angle which is different from the first angle with respect to the vertical direction in the reflection plane. The light beam with the first wavelength $\lambda_1$ is reflected by the wide band high-reflection mirror 11 toward a dichroic mirror 12. The dichroic mirror 12 reflects the first-reflected light beam with the first wavelength at a second angle back toward the wide band high-reflection mirror 11. The dichroic mirror 12 also allows only a light beam having a second wavelength different from the first wavelength to penetrate and reflects the other incident light beams with other wavelengths. Thus, the dichroic mirror 12 combines the light beam with the second wavelength which penetrated through the mirror and the second-reflected light beam with the first wavelength.

This combined light beam is reflected by the wide band high-reflection mirror 11 toward a second dichroic mirror 13. The second dichroic mirror 13 reflects the combined light beam reflected from the wide band high-reflection mirror 11 toward a wide band anti-reflection coating film 14. The second dichroic mirror 13 also allows only a light beam having a third wavelength different from the first and second wavelengths to penetrate and reflects the other incident light beams with other wavelengths. Thus, the second dichroic mirror 13 combines the light beam with the third wavelength which penetrated through the mirror and the combined light beam to achieve a second combined light beam having all three wavelengths $\lambda_1$, $\lambda_2$, and $\lambda_3$, which is reflected toward the wide band anti-reflection coating film 14.

The wide band anti-reflection coating film 14 allows the combined light beam to penetrate without reflection outside the flat plate. The flat plate 15 is made of a material which is preferably white-light transparent. The thickness of the material is fixed so that the point at which the light beam with the first wavelength reflected by the wide band high-reflection mirror is reflected a second time by the first dichroic mirror is the same as the point at which the light beam with the second wavelength penetrates into the material by the first dichroic mirror. The anti-reflection coating film 10 and the dichroic mirrors 12 and 13 are arranged with the wide band high-reflection mirror 11 and the wide band anti-reflection coating film 14 so that they are in parallel with each other as seen in FIG. 1.

As one embodiment of the present invention, when the incident light beams are three light beams with wavelengths of red, green and blue, respectively, which light beams enter the light combining apparatus parallel to one another at a first angle with respect to the vertical direction on the incident plane, the apparatus comprises:

(a) an anti-reflection coating film which allows the light beam with the first wavelength to penetrate without reflection at the first angle into a material;

(b) a first wide band high-reflection mirror reflecting the light beam with the first wavelength which has penetrated into the material at a second angle which is different from the first angle;

(c) a first dichroic mirror which generates a first combined light beam by allowing only a light beam with the second wavelength to penetrate into the material at the first angle and reflecting the light beam with the other wavelengths and by reflecting for a second time the reflected light beam with the first wavelength at the second angle at the point at which the light beam with the second wavelength penetrates into the material;

(d) a second wide band high-reflection mirror reflecting the first combined light beam at the second angle in the material;

(e) a second dichroic mirror generating a second combined light beam by allowing only a light beam with the third wavelength different from the first wavelength and the second wavelength to penetrate into the material at the first angle and reflecting the light beams with the other wavelengths and by reflecting the first combined light beam at the second angle at the point which the light beam with the third wavelength penetrate;

(f) a second wide band anti-reflection coating film which allows the second combined light beam without reflection to penetrate outside the material; and (g) the material through which the light beam with the first wavelength, the reflected light beam, the first combined light beam and the second combined light beam pass.

According to one embodiment, a method of combining light beams, wherein three light beams of red, green and blue enter an apparatus parallel to one another and at a first angle with respect to the vertical direction in the incidence plane, the method comprising of steps of:

(a) penetrating only a light beam with a first wavelength into a material at a first angle without reflection;

(b) reflecting the light beam with the first wavelength penetrated into the material at a second angle which is different from the first angle;

(c) generating a first combined light beam by allowing only a light beam with a second wavelength different from the first wavelength to penetrate into the material at the first angle and reflecting the light beams with other wavelengths, and by reflecting the reflected light beam with the first wavelength at the second angle at the point at which the light beam with the second wavelength penetrates into the material;

(d) reflecting the first combined light beam at the second angle in the material;

(e) generating a second combined light beam by allowing only a light beam with a third wavelength different from the first wavelength and the second wavelength to penetrate into the material at the first angle and reflecting the light beams with other wavelengths and by reflecting the first combined light beam at the second angle at the point at which the light beam with the third wavelength penetrates the material; and penetrating the second combined light beam without reflection outside the material.

The first angle or the thickness of the material or both can be adjusted so that the reflected light beam with the first wavelength can be combined at the point that the light beam with the second wavelength penetrates into the material and the first combined light can be combined with the light beam with the third wavelength at the point at which the light beam with the third wavelength penetrates the material.

According to one embodiment of the present invention, a method for manufacturing a light combining apparatus comprises the steps of:

(a) applying an anti-reflection coating film on a section of one side of a flat plate, the flat plate having a thickness t, a refractive index $n_G$ and sufficient flatness of both sides to allow the light beam with a first wavelength entered at a first angle from a light source to penetrate, without reflection, into the plate;

(b) applying a first wide band high-reflection mirror at the section on the plate on an opposite side with respect to the side where the anti-reflection coating film is applied to reflect the light beam with the first wavelength which has penetrated through the anti-reflection coating film at a second angle which is different from the first angle;

(c) applying a first dichroic mirror on the same surface of the plate on which the anti-reflection coating film is applied to be adjacent to the anti-reflection coating film to generate a first combined light beam by allowing only the light beam with a second wavelength different from the first wavelength to penetrate into the material and reflecting the light beams with the other wavelengths and by reflecting the reflected light beam from the first wide band high-reflection mirror at the second angle into the material at the point at which the light beam with the second wavelength penetrates the material;

(d) applying a second wide band high-reflection mirror on the same surface of the plate on which the first wide band high-reflection coating film is applied adjacent to the first wide band high-reflection mirror to reflect the first combined light reflected from the first dichroic mirror at the second angle into the material;

(e) applying a second dichroic mirror on the same surface of the plate on which the anti-reflection coating film and the first dichroic mirror are applied adjacent to the first dichroic mirror to generate a second combined light by allowing only the light beam with the third wavelength different from the first wavelength and the second wavelength into material and reflecting the light beams with other wavelengths and by reflecting the first combined light beam from the second wide band high-reflection mirror at the second angle at the point at which the light beam with the third wavelength penetrates the material; and (f) applying a second wide band anti-reflection coating film on the same surface of the plate on which the first wide band high-reflection coating film is applied opposite to the second wide band high-reflection mirror to allow the second combined light beam to penetrate without reflection at the first angle outside the material.

The present invention has advantages in that the system can be made compact by the method of three incident color light beams combined automatically by entering the flat plate 15. The system according to the present invention can also be supplied at a low price. The alignment of the light beams is not easy when dichroic mirrors in the prior art are used, however, the system according to the present invention has an advantage in that the light beams are aligned automatically by the flatness and parallelism of the flat plate surfaces.

FIG. 1 illustrates a general structure of the system to illustrate the light combining hybrid dichroic mirrors using the flat plate according to the present invention. In FIG. 1, the flat plate 15 is provided with an anti-reflection coating film 10, a wide band high-reflection coating film 11, dichroic mirror coating films 12 and 13, and a wide band anti-reflection coating film 14. According to a preferred embodiment, the flat plate 15 is made of a white-light transparent material.

In FIG. 1, three equidistant color light beam having wavelengths $\lambda_1, \lambda_2, \lambda_3$, enter the flat plate 15 as follows. The light beam having a first wavelength penetrates through anti-reflection film 10 at one incident angle ($\theta_0$) and is reflected by the wide band high-reflection film 11. The reflected light beam is combined with a light beam having a second wavelength penetrated through the dichroic mirror 12 to form a first combined light beam. The first combined light beam is reflected by the wide band high-reflection film 11 and is combined with the light beam with the third wavelength penetrated by the second dichroic mirror 13 to form a second combined light beam. The second combined light beam penetrates through the second wide band anti-reflection mirror 14 and proceeds outside the material.

Figure 2:
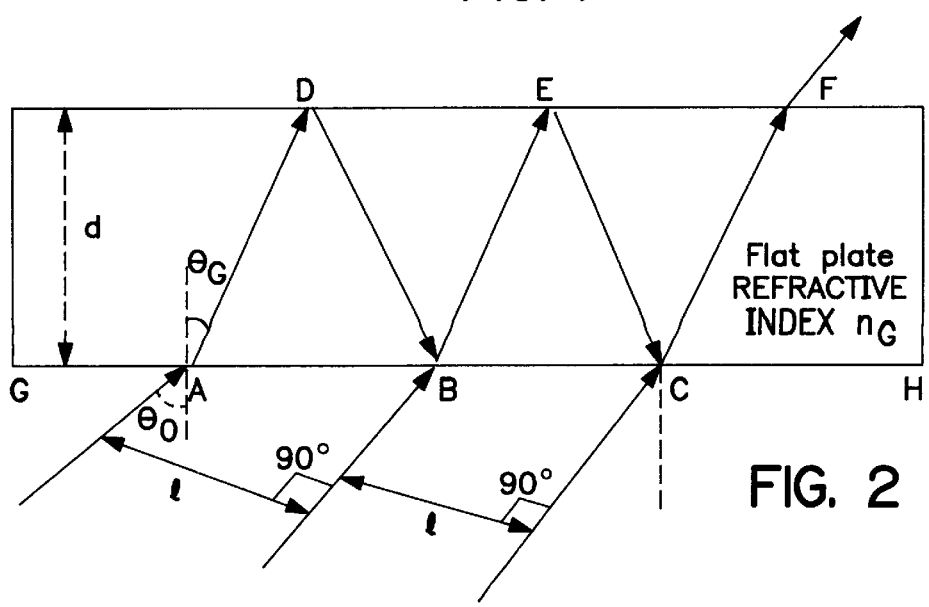
FIG. 2 illustrates the dimensions of a light combining hybrid dichroic mirror using the flat plate of present invention.
Figure 3:
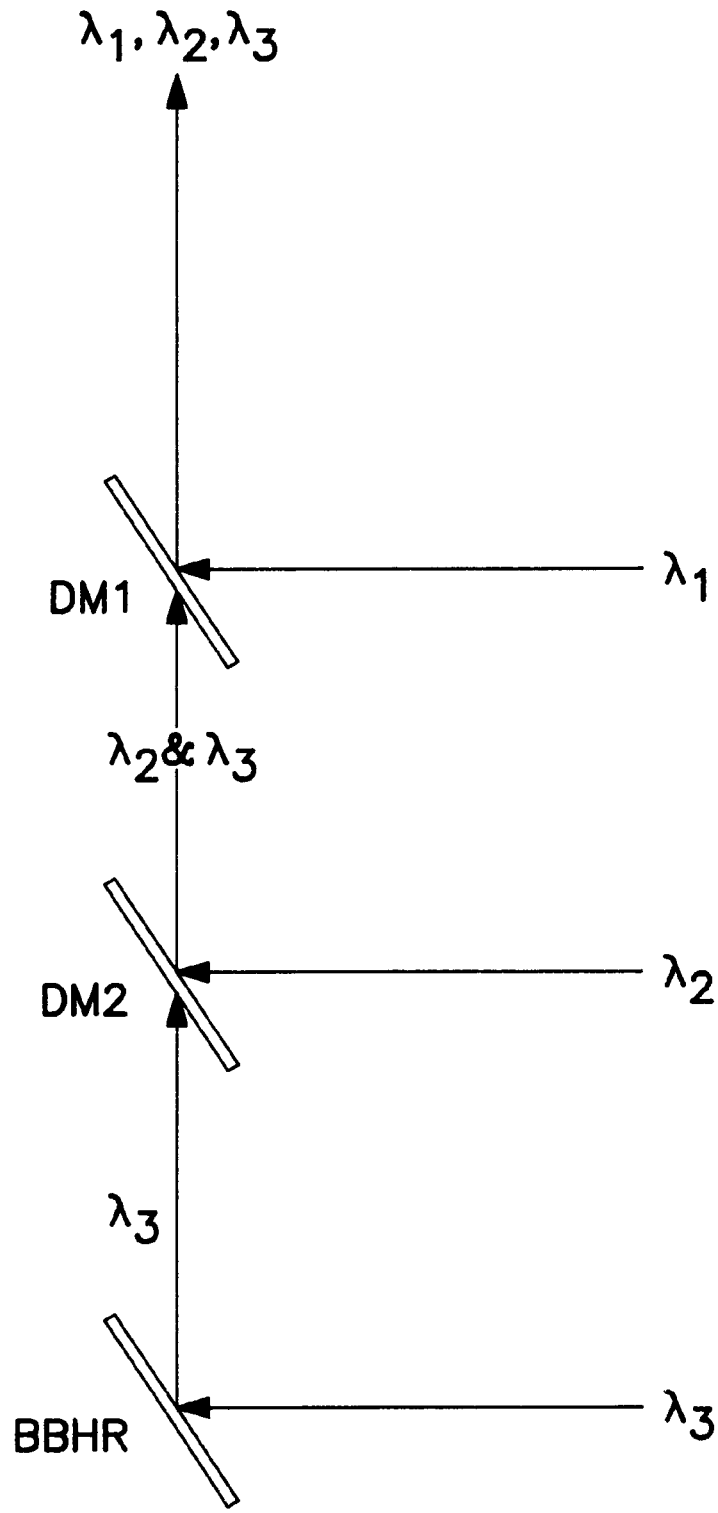
FIG. 3 illustrates a general structure of means for light combining in the prior art.

The size of this system is determined by the calculation of following math equation, which is described with reference to FIG. 2. In FIG. 2, when the incident light beam enters with an angle of $\theta_0$ degrees, the interval separating each light beam of red, green, and blue $\lambda_1, \lambda_2, \lambda_3$ is a fixed size 1 mm, and the refractive index of the flat plate 15 are $n_1, n_2, n_3$, respectively according to each wavelength, the difference in their refractive indices is a negligible quantity in the area of a visible ray. Accordingly, if it is assumed that the angle of refraction of each of the wavelengths entered into the flat plate is the same as one another, the thickness of the flat plate 15 is determined by the following Equation 1 and the lengths of the width and height are calculated by Equation 2.

$$d = \frac{l}{2\cos\theta_0 \tan\left(\sin^{-1}\frac{\sin\theta_0}{n_G}\right)} \quad \text{[Equation 1]}$$

$$\text{width length} = \frac{3l}{\cos\theta_0} \quad \text{[Equation 2]}$$

$$\text{height length} = \frac{3l}{\cos\theta_0}$$

For instance, when l=5 mm and $\theta_0$=30 mm, the length is about 17 mm. This is 9 times smaller as compared with at least 15 mm obtained using the prior art optical devices.

As stated above, according to the present invention the structure is simple compared with the structure of the prior art light combining sub-system, the size is small, and the combination of three colors is performed automatically. Therefore, the present invention can be used for displaying a large-area image by projecting the image directly on a screen with a small-sized optical system, and it is very effective for compact light combining system such as the light combining systems of color printers.

As stated above, the present invention demonstrates similar performance to prior art optical system though it is a relatively small-sized light combining structure, so that cost-effective mass production of products and small-sized products are possible. Specifically, the present invention has the advantage of providing a massive color combining system with a highly compact size at a low price.

We claim:

1. A light combining apparatus using a flat plate operating to combine at least two incident light beams entering the flat plate at a first angle with respect to the vertical direction on an incidence plane with wavelengths different from each other, the apparatus comprising:

a first anti-reflection coating film for allowing only a light beam with a first wavelength to penetrate into the flat plate without reflection;

a first wide band high-reflection mirror for reflecting the light beam with the first wavelength which penetrates through said first anti-reflection coating film at a second angle which is different from the first angle;

a first dichroic mirror for generating a first combined light beam by allowing only a light beam with a second wavelength different from said first wavelength and reflecting the light beams with other wavelengths and by reflecting said reflected light beam with the first wavelength at said second angle, and for generating a first combined light beam by combining said light beam with the second wavelength and said reflected light beam with the first wavelength;

a second wide band anti-reflection coating film for allowing said combined light beam to penetrate without reflection; and a material within the flat plate through which the light beam penetrated through said first anti-reflection coating film and said first dichroic mirror and the light beam reflected from said first wide band high-reflection coating film and said first dichroic mirror proceed.

2. A light combining apparatus as set forth in claim 1, wherein the thickness of said material is fixed such that a point at which the light beam with the first wavelength reflected by said first wide band high-reflection mirror is reflected by said first dichroic mirror is the same as a point at which the light beam with the second wavelength penetrates into said material by said first dichroic mirror.

3. A light combining apparatus as set forth in claim 1, wherein said at least two incident light beams comprise three light beams having wavelengths of red, green and blue entering parallel to one another at said first angle.

4. A light combining apparatus as set forth in claim 2, wherein said first anti-reflection coating film and said first dichroic mirror are arranged with said first wide band high-reflection mirror and said second wide band anti-reflection coating film so that they are in parallel with each other.

5. A light combining apparatus as set forth in claim 4, wherein said at least two incident light beams comprise three light beams having wavelengths of red, green and blue entering parallel to one another at said first angle.

6. A light combining apparatus as set forth in claim 1, wherein said first dichroic mirror reflects said reflected light beam with said first wavelength at said second angle at a point at which said light beam with said second wavelength penetrates, and wherein said first wide band high-reflection mirror reflects said first combined light beam at said second angle within said material, and wherein said apparatus further comprises:

a second dichroic mirror for generating a second combined light beam by allowing only a light beam with a third wavelength different from said first wavelength and said second wavelength to penetrate into said material at said first angle and reflecting the light beams with the other wavelengths and by reflecting said reflected combined light beam at said second angle at the point which said light beam with said third wavelength penetrates; and wherein said second wide band anti-reflection coating film allows said second combined light beam to penetrate without reflection outside said material.

7. A method of combining at least three light beams having different wavelengths entering a flat plate parallel to one another at a first angle with respect to the vertical direction with respect to an incidence plane, the method comprising steps of:

allowing only a light beam with a first wavelength to penetrate into a material within said flat plate at a first angle without reflection;

reflecting said light beam with said first wavelength which has penetrated into said material at a second angle which is different from the first angle;

generating a first combined light beam by allowing only a light beam with a second wavelength different from said first wavelength to penetrate into said material at said first angle and reflecting the light beams with the other wavelength and by reflecting said reflected light beam with said first wavelength at said second angle at a point at which said light beam with said second wavelength penetrates;

reflecting said first combined light beam at said second angle within said material;

generating a second combined light beam by allowing only light with a third wavelength different from said first wavelength and said second wavelength to penetrate into said material at said first angle and reflecting the light beam with the other wavelengths and by reflecting said reflected first combined light beam at said second angle at a point at which said light beam with said third wavelength penetrates; and allowing said second combined light beam to penetrate without reflection outside said material.

8. A method of combining at least three light beams as set forth in claim 7, wherein at least one of said first angle or a thickness of said material are adjusted such that said reflected light beam with said first wavelength can be combined at the point at which said light beam with said second wavelength penetrates into said material and said reflected first combined light beam can be combined at the point at which said light beam with said third wavelength penetrates into said material.

9. A method for manufacturing a light combining apparatus by using one flat plate formed of a material comprising steps of:

applying a first anti-reflection coating film at a section of one side of said flat plate having thickness t, refractive index $n_G$ and a sufficient flatness of both sides to allow a light beam with a first wavelength which enters said material at a first angle, to penetrate without reflection;

applying a first wide band high-reflection mirror at a section of an opposite side of the flat plate with respect to the side where said first anti-reflection coating film is applied to reflect said first light beam with said first wavelength which penetrates into said material from said first anti-reflection coating film at a second angle which is different from the first angle;

applying a first dichroic mirror on the same side of the plate on which said first anti-reflection coating film is applied and adjacent to said first anti-reflection coating film to generate a first combined light beam by allowing the only light with a second wavelength different from said first wavelength to penetrate into said material and reflecting light beams with other wavelengths and by reflecting the reflected light beam from said first wide band high-reflection mirror at said second angle at a point at which said light beam with said second wavelength penetrates;

applying a second wide band high-reflection mirror on the same surface of the plate on which said first wide band high-reflection coating film is applied and adjacent to said first wide band high-reflection mirror to reflect said first combined light beam reflected from said first dichroic mirror at said second angle;

applying a second dichroic mirror on the same surface of the flat plate on which said first anti-reflection coating film and said first dichroic mirror are applied and adjacent to said first dichroic mirror to generate a second combined light beam by allowing only a light beam with a third wavelength different from said first wavelength and said second wavelength to penetrate into said material and reflecting the light beams with other wavelengths and by reflecting the reflected light beam from said second wide band high-reflection at said second angle at a point at which said light beam with said third wavelength penetrates; and applying a second wide band anti-reflection coating film on the same surface of the plate on which said first and said second wide band high-reflection mirrors are applied and adjacent to said second wide band high-reflection mirror to allow said second combined light beam to penetrate without reflection outside said material.

10. A method for manufacturing a light combining apparatus as set forth in claim 9, wherein the process of providing said first and said second wide band high-reflection mirrors is performed as one step.

* * * * *